United States Patent
Elliott et al.

[15] 3,697,139
[45] Oct. 10, 1972

[54] SKID CONTROL SYSTEM MAXIMUM CYCLIC LIMITER

[72] Inventors: Delbert R. Elliott; William T. Lewis, both of South Bend, Ind.

[73] Assignee: The Bendix Corporation

[22] Filed: July 8, 1970

[21] Appl. No.: 53,045

[52] U.S. Cl. .................. 303/21 P, 303/20, 307/217
[51] Int. Cl. ............................................... B60t 8/12
[58] Field of Search ...188/181; 303/20, 21; 324/160, 324/161, 162; 340/262, 263; 307/217

[56] References Cited

UNITED STATES PATENTS

| | | | |
|---|---|---|---|
| 3,524,685 | 8/1970 | Harned et al. | 303/20 X |
| 3,545,819 | 12/1970 | Gaffney et al. | 303/21 R |
| 3,494,671 | 2/1970 | Slavin et al. | 303/21 P |
| 3,275,384 | 9/1966 | Hirzel | 303/21 EB |
| 3,544,172 | 12/1970 | Howard et al. | 303/21 P |

*Primary Examiner*—Milton Buchler
*Assistant Examiner*—Stephen G. Kunin
*Attorney*—William N. Antonis and Plante, Hartz, Smith and Thompson

[57] ABSTRACT

An inhibit to prevent the premature operation of a solenoid valve of a modulator in an adaptive braking system. Upon application of the brakes of a wheeled vehicle, if an imminent skid condition is sensed, a signal will actuate the solenoid valve of the modulator to decrease brake pressure. Once the solenoid valve has been actuated, the subsequent cycle of the modulator for the same brake application will be inhibited until a time period has passed. After the time period has passed wherein brake pressure has been rebuilt, another signal can actuate the solenoid to again decrease the brake pressure if another imminent skid condition is sensed. The inhibit prevents intermediately received signals from actuating the modulator until the time period has occurred. Such an inhibit reduces electrical noise problems on rough surfaces, as well as erroneous signals due to vehicle mechanical and hydraulic resonances.

8 Claims, 3 Drawing Figures

PATENTED OCT 10 1972 3,697,139

INVENTORS
DELBERT R. ELLIOTT
WILLIAM T. LEWIS
BY Plante, Hartz, Smith
& Thompson
ATTORNEYS

SKID CONTROL SYSTEM MAXIMUM CYCLIC LIMITER

BACKGROUND OF THE INVENTION

The present invention is an improvement on present adaptive braking systems, such as the one described in U.S. Pat. No. 3,494,671 which is hereby incorporated by reference.

The present adaptive braking systems in automotive vehicles regulate the brake pressure to give increased lateral stability and decreased stopping distance. The most common way to decrease brake pressure is through the use of a modulator which is located between the source of pressurized fluid and the brake cylinder whereby the modulator interrupts the source of pressurized fluid and relieves the pressurized fluid in the wheel cylinder. Control logic has been developed so that the modulator will relieve the brake pressure only when an imminent skid condition is sensed. Once the skid condition no longer exists, the brake pressure in the wheel cylinder is restored to equal the brake pressure from the master cylinder or until another imminent skid condition is sensed.

The signals used to control the modulator are received from the control logic. The control logic normally has an input which represents the rotational velocity of the wheel(s) desired to be controlled. Other inputs such as vehicle velocity or acceleration may or may not be available to the control logic. However, from the wheel speed sensor, the control logic processes the sensor output signal to give an output voltage that is used to control the modulator. The present invention concerns this output voltage that controls the operation of the modulator. It has been found through actual road tests that the typical automotive vehicle will generate erroneous noise spikes within the control logic. To develop a system that is economically practical for use on an automotive vehicle and reliable enough to insure safe non-skid stopping, an inhibit has been incorporated in the output stage of the control logic whereby the control signal will be inhibited for a given time period after a preceeding control signal has been received. This prevents the premature operation of the control modulator whereby the brake pressure may be prematurely reduced and consequently, preventing a maximum braking effort to give the shortest possible stopping distance. The inhibit prevents this premature operation of the modulator.

SUMMARY OF THE INVENTION

It is an object of this invention to provide an inhibit to be used in an anti-skid braking system whereby a maximum braking effort can be obtained.

It is another object of this invention to provide an inhibit circuit for use in the output stage of the control logic of an anti-skid system to prevent subsequent premature cycling of a modulator which reduces the brake pressure in the wheel cylinder.

It is a further object of this invention to take the normal output signal that controls the modulator of a braking system and delay this output signal for a short period of time. The delayed output signal and the normal output signal are fed through an OR gate into an AND gate in a series loop with the normal output signal whereby, if the normal output signal is ever lost, another output signal that is received within a period of time cannot pass through the AND gate to be received by the modulator.

It is an even further object of this invention to modify U.S. Pat. No. 3,494,671 to incorporate the inhibit circuit with the control logic.

DESCRIPTION OF THE PREFERRED EMBODIMENT

Figure 1:
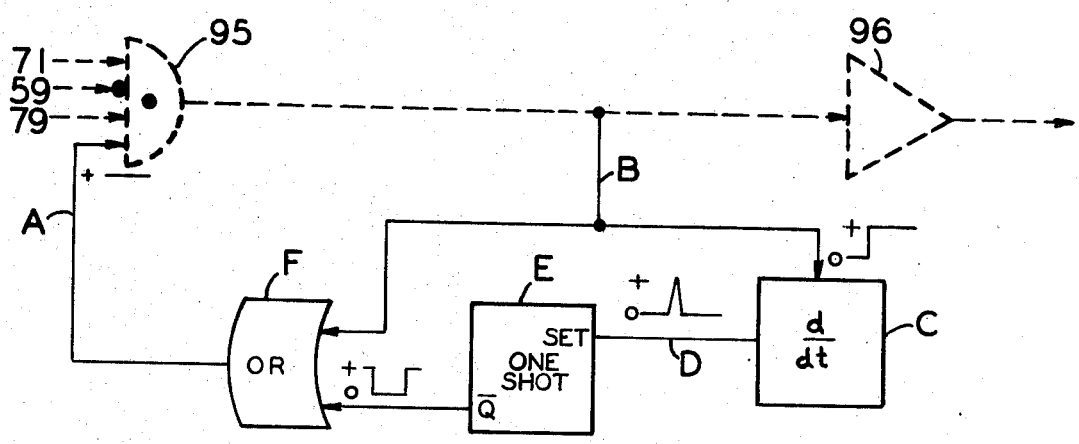
FIG. 1 is an illustrative block diagram of how the inhibit can be incorporated into the system shown in FIG. 1 of U.S. Pat. No. 3,494,671 which is partially shown in broken lines.

For a description of a typical anti-skid system in which the instant invention can be utilized, see U.S. Pat. No. 3,494,671 which is incorporated herein by reference. To avoid confusion between the reference numerals of the incorporated patent and the present application, the present application will use letters to designate any component part not included in the incorporated patent. Any component part that is included in the incorporated patent will be given the same reference numeral in this application as it has in the incorporated patent. Referring now to FIG. 1 of the incorporated patent, one can readily see that the AND gate 95 represents the final output signal before amplification by amplifier 96 to operate the modulator 15. Therefore, it is at this point that the inhibit circuit should be included to prevent premature operation of the modulator 15 by subsequently received signals from the AND gate 95. Therefore, referring to FIG. 1 of the present application, the AND gate 95 and the amplifier 96 are shown in broken lines.

In FIG. 1 of the present application, one can see that the conditions necessary for an output from the AND gate 95 would be inputs 71, 59, 79 and A. The input 71 represents the voltage received from memory means 71, the input 59 represents the input received from comparator 59, and the input 79 represents the input received from the brake. These inputs are more fully described in the incorporated patent. The new input A for AND gate 95 is at a high voltage potential, except at times as will be subsequently described. During a hard application of the vehicle brakes resulting in imminent skidding of the controlled wheel(s), because the new input A is at a high potential, inputs 71 and 79 are at a high potential, and input 59 which is subsequently inverted, is at a low potential, an output B from AND gate 95 will be given. The output B of AND gate 95 is fed into a derivative circuit C of the inhibit circuit. The derivative circuit C produces derivative output D which is used to trigger one shot E. The one shot E has an RC time constant that may be varied according to the different systems in which the inhibit may be operating. An approximate value for use in the reference patent would be about 210 milli-seconds. Therefore, the $\bar{Q}$ output of the one shot E will be at zero during this time period. An OR gate F receives the B output of AND gate 95 and the $\bar{Q}$ output of one shot E. Therefore, when there is an output B from AND gate as or an $\bar{Q}$ output from one shot E is present, there will be an input A into AND gate 95 from OR gate F. Notice particularly, however, if output B is ever lost during the 210 milli-second timing for the one shot E, then OR gate F will not have a voltage input. Without a voltage input, input A, which corresponds to the output of the OR gate F, would drop to zero. When input A drops to zero, AND gate 95 cannot have another output until input A has again returned to a positive voltage level. Input A cannot return to a positive voltage level until the time delay of the one shot E has elapsed, allowing $\bar{Q}$ output to resume its normally high level.

A representative example would be as follows. Assume the one shot E has a time delay of 210 milliseconds. At time $t$ equal to zero AND gate 95 has an output B which thereby triggers one shot E. At time $t$ equal to 50 milli-seconds, output B drops to zero. Because OR gate F no longer has a positive voltage input since one shot E has not timed out to give a $\bar{Q}$ output, input A will drop to zero. At time $t$ equal to 100 milli-seconds all the conditions for an output from AND gate 95 are realized except input A is still at its zero level. Therefore, AND gate 95 will not give output B. Thereby the operation of the modulator is inhibited until one shot E has timed out through the 210 milli-seconds to allow input A to return to the positive voltage level. If the inputs 59, 71 and 79 were the result of erroneous or undesired control signals, then the premature output B of AND gate 95 has been inhibited thereby preventing a premature operation of the modulator 15.

Figure 2:
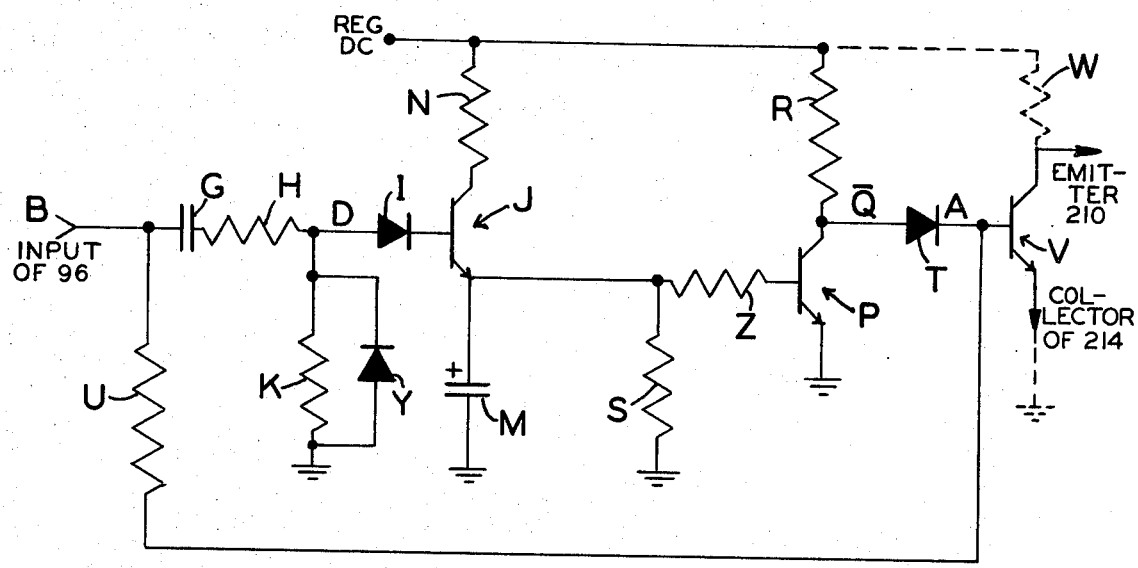
FIG. 2 is an electrical schematic of the inhibit as incorporated into the system of FIG. 6B of U.S. Pat. No. 3,494.671.

Referring now to FIG. 2 of the present application, it will be shown how the inhibit circuit can be included in the system of FIG. 6b of the incorporated patent. Transistors 212, 210 and 214 are the input transistors for signals received from memory means 71, comparator 59 and brake switch 79, respectively. Transistor 215 is a preliminary amplification stage used to drive amplifier 96. Therefore, we may receive an input signal to the inhibit circuit either from the output of transistor 215 or from the input to transistor 215.

For the purposes of this application, the output of transistor 215 is picked off between resistors 223 and 224 which corresponds with output B of AND gate 95. When the input to drive amplifier 96 goes positive, a capacitor G charges through resistor H and resistor K of the derivative circuit C within a very short time. While capacitor G is charging, a positive voltage spike is produced through diode I on the base of transistor J. Capacitor G remains charged until the positive input to drive amplifier 96 is removed. Capacitor G then discharges rapidly through resistor H and bypass diode Y. Bypass diode Y and blocking diode I prevent the appearance of a negative voltage spike on the base of transistor J during the discharge of capacitor G. When the positive voltage spike is realized on the base of transistor J, the capacitor M will charge almost instantaneously through low valued resistor N. When the positive voltage spike on the base of the transistor J disappears, transistor J will cut off. However, capacitor M has already been charged. The voltage across capacitor M is fed into the base of transistor P through resistor Z thereby changing transistor P into the conducting stage. Before transistor P goes in to the conducting stage, the collector side which is the $\bar{Q}$ output of the one shot E is at a voltage potential equal to the regulated DC supply because literally no current is flowing through resistor R. However, once transistor P begins to conduct, the $\bar{Q}$ output drops to a potential close to ground. The length of time transistor P will conduct is determined by the value of capacitor M and the value of large resistor S. Once the capacitor M has discharged through large resistor S, the transistor P will cut off and the $\bar{Q}$ output of one shot E will again rise to a positive voltage level. The $\bar{Q}$ output of the one shot E is fed through OR gate diode T to the input A of AND gate 95. Also, the voltage at the input of amplifier 96 is fed through OR gate resistor U to the A input of AND gate 95. Input A is fed into the base of AND gate transistor V which is connected in series with AND gate transistors 212, 210 and 214. For the purposes of location only, transistor V is shown located between the emitter of transistor 210 and the collector of transistor 214. With this modification, unless a voltage is realized at input A of transistor V, no output can be realized from AND gate 95. Therefore, no signal will be received to operate modulator 15.

The same modification can be inserted between AND gate 82 and 83 as shown in FIG. 1 of the incorporated patent. Also, the modification can be included in control channel 44. With a very simple modification to FIG. 2 of the present application, the inhibit can be modified to be included in any control channel other than the one described in the incorporated application. For example, the inclusion of resistor W (shown in dotted lines) between the collector output of transistor V and the regulator DC supply, and the connection of the emitter of transistor V to ground, would change the inhibit circuit so that it could be included in other types of control circuits for adaptive braking. All that is necessary is that the output B which is fed into the derivative circuit C be the control signal that will operate the modulator. The output of transistor V should be connected in series with another transistor which forms an AND gate that has all the other necessary inputs to give an output voltage which controls the modulator.

Figure 3:
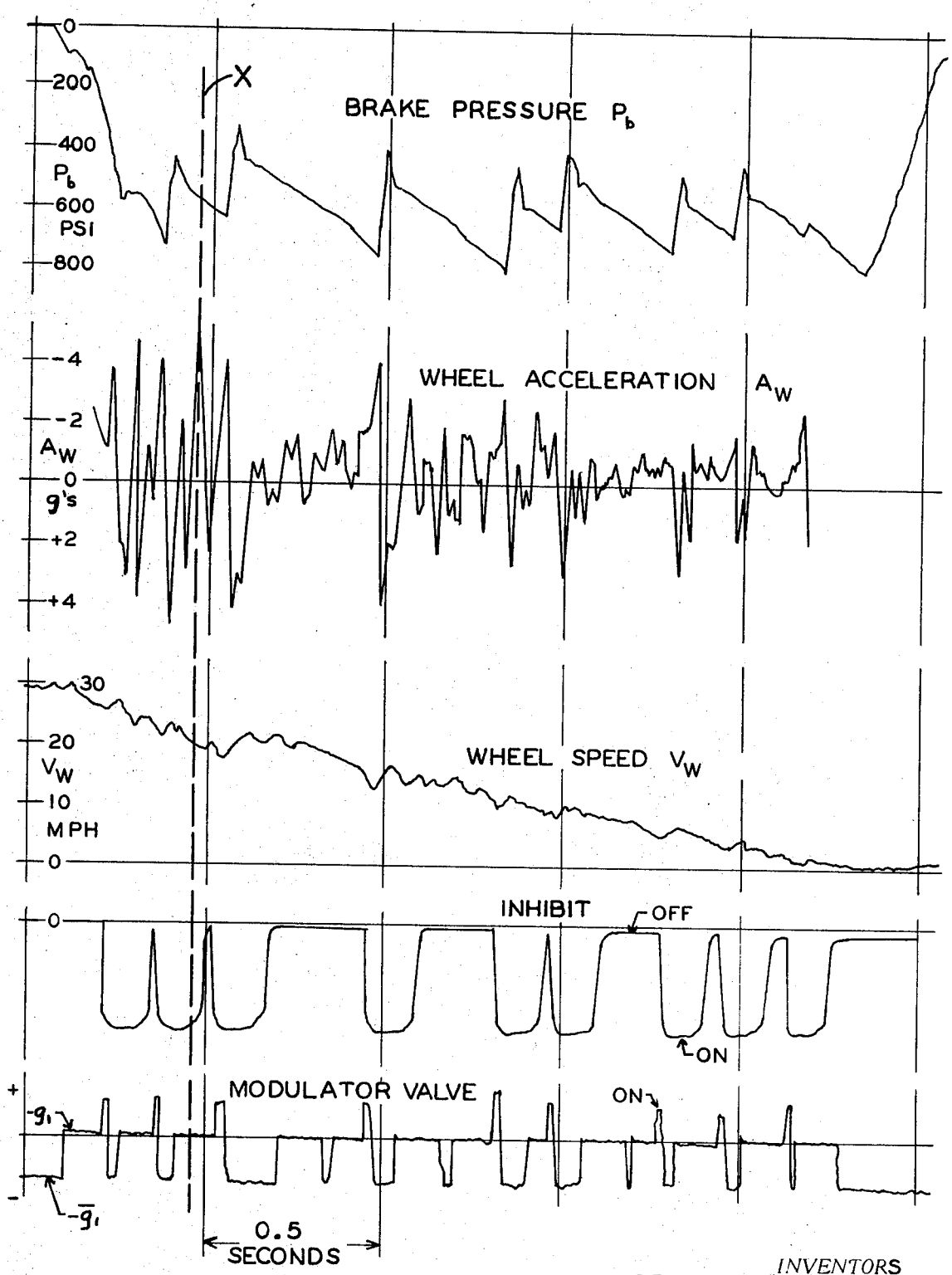
FIG. 3 is actual test data recorded during an application of an anti-skid brake system with the inhibit circuit, the application being sufficient to cause skidding in normal braking systems.

Referring now to FIG. 3 there is shown an actual plot of test data received from an anti-skid system with the inhibit circuit. The brake pressure $P_b$, wheel acceleration $A_w$, wheel speed $V_w$, inhibit, and modulator valve are all plotted on the same time scale. Referring specifically to the inhibit, when the inhibit is off, the one shot has timed out and the $\bar{Q}$ input to the OR gate is at a positive voltage level. When the inhibit is on, the modulator cannot receive another signal from the AND gate 95 because $\bar{Q}$ is at a zero voltage level. As a specific point of reference, refer to line X. At that point in time, wheel acceleration $A_w$ is at a negative value which exceeds the -$g$ set point. Also, the necessary wheel speed slip is exceeded. The brake switch is on. Therefore, all the conditions for an output from AND gate 95 have been met except the inhibit is still ON because the one shot E has not been reset since the previous cycle. Therefore, a modulator 15 will not receive the ON signal. The ON signal is represented by the positive most voltage of the modulator valve wave form. Notice that simultaneously with the modulator valve ON signal, the inhibit circuit is also turned ON. Therefore, another modulator ON signal cannot be received until the inhibit has timed out.

The inhibit ON time for the present invention is at a constant time period. However, this may be modified to give a variable inhibit ON time. Thus, the inhibit time period may be a function of other variables which will allow the period to be adaptable to the needs of the moment. The range of values that can be used for the ON time of the inhibit in the incorporated patent is roughly between 80–350 milli-second.

We claim:

1. In an adaptive braking system for a wheeled vehicle having a modulator for relieving brake pressure between a wheel cylinder and a master cylinder to prevent the skidding of the vehicle wheels during a hard application of a brake pedal, including control logic for generating signals that are used to operate the modulator, an inhibit means comprising:

means for delaying said signals from said control logic after a change in voltage levels;

means for said signals from said control logic to bypass said delaying means of said inhibit means; and gating means incorporated with said control logic for receiving said delayed signal and said bypassed signal from said control logic, when said signal from said control logic changes a second time within a time interval so that a further change cannot pass the gating means to operate the modulator unless said further change still exists after said time interval;

said delay means further comprising derivative means for initially receiving said signal from said control logic and taking the derivative thereof and trigger means for starting said time interval upon receiving the derivative output of said signal from said control logic, said delayed signal being generated after said time interval has expired.

2. The inhibit means, as recited in claim 1, wherein said derivative means is a capacitive input to said inhibit means.

3. The inhibit means, as recited in claim 1, wherein said time interval of said trigger means is determined by an RC time constant which gives the ON time of a one shot.

4. The inhibit means, as recited in claim 3, wherein said time interval is approximately 210 milli-seconds.

5. An inhibit means for use in an adaptive braking system to prevent modulation of brake pressure due to noise spikes in a control unit during adaptive braking, said inhibit means comprising:

input shaper means for giving a sharply changing pulse when an output voltage from the control unit is received;

first switching means for charging a timing circuit in response to said sharply changing pulse from said input shaper means;

second switching means for generating a voltage except when said charge of said timing circuit is being decayed; and gating means for preventing a second output voltage of the control unit from modulating the brake pressure unless the second output voltage still exists after said timing circuit has discharged and said second switching means is again generating a voltage;

said gating means comprising an AND gate having inputs to yield said control unit output voltage if normal AND gate input conditions, and an addition input condition are met, and an OR gate for satisfying said addition input condition unless the voltage from said second switching means or the output voltage drops to zero.

6. In an adaptive braking system including a modulator for relieving braking pressure in a fluid pressure actuated brake, gating means responsive to a plurality of inputs for actuating said modulator, means for inhibiting the output signal of said gating means for a predetermined time interval after termination of said output signal comprising:

signal generating means normally producing an output signal, but terminating production of said output signal of said signal generating means for said predetermined time interval after termination of the output signal of said gating means;

said gating means being responsive to termination of its output signal and to termination of the output signal of said signal generating means to inhibit the output signal of said gating means for said predetermined time interval.

7. The invention of claim 6; and means for differentiating said output signal of said first gating means having an input connected to the output of said first gating means and an output connected to the input of said pulse generating means.

8. In an adaptive braking system including a modulator for relieving braking pressure in a fluid pressure actuated brake, first gating means responsive to a plurality of inputs for actuating said modulator, means for inhibiting the output signal of said first gating means for a predetermined time interval after termination of said output signal comprising:

second gating means having an output connected to one of the inputs of said first gating means, and a first input connected to the output of said first gating means;

signal generating means normally producing an output signal, but terminating production of said output signal for a predetermined time interval after termination of the output signal of said first gating means;

the output of said signal generating means being connected to an input of said second gating means, said second gating means producing an output signal when an input signal is transmitted to either of said inputs but terminating said output signal of said second gating means when the input signals transmitted to all of the inputs of said second gating means are terminated, whereby the output signal of said first gating means is inhibited for said predetermined time interval after the output signal from said first gating means is terminated.

* * * * *